US009383673B2

(12) United States Patent
Jeong

(10) Patent No.: US 9,383,673 B2
(45) Date of Patent: Jul. 5, 2016

(54) POWER CONTROL APPARATUS AND IMAGE FORMING APPARATUS

(71) Applicant: SAMSUNG Electronics Co., Ltd., Suwon-si, Gyeonggi-do (KR)

(72) Inventor: An Sik Jeong, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 68 days.

(21) Appl. No.: 13/961,971

(22) Filed: Aug. 8, 2013

(65) Prior Publication Data

US 2014/0044447 A1 Feb. 13, 2014

(30) Foreign Application Priority Data

Aug. 9, 2012 (KR) ........................ 10-2012-0087248

(51) Int. Cl.
*G03G 15/20* (2006.01)
*G03G 13/20* (2006.01)
*G03G 15/00* (2006.01)
*H02M 1/00* (2006.01)

(52) U.S. Cl.
CPC ............ *G03G 13/20* (2013.01); *G03G 15/2039* (2013.01); *G03G 15/5004* (2013.01); *G03G 15/80* (2013.01); *H02M 1/00* (2013.01)

(58) Field of Classification Search
USPC .............................................. 399/69; 307/128
See application file for complete search history.

(56) References Cited

U.S. PATENT DOCUMENTS

| | | | | |
|---|---|---|---|---|
| 4,882,782 | A * | 11/1989 | Kimizuka et al. | 361/100 |
| 5,365,311 | A * | 11/1994 | Matsuoka | 399/13 |
| 5,917,691 | A * | 6/1999 | Kadah | 361/154 |
| 7,190,091 | B1 * | 3/2007 | Marshall | 307/26 |
| 8,542,372 | B2 * | 9/2013 | Nishio | 358/1.13 |
| 8,582,336 | B2 * | 11/2013 | Tanaka | 363/142 |
| 2006/0274465 | A1 * | 12/2006 | Wu et al. | 361/56 |
| 2011/0085813 | A1 * | 4/2011 | Na | 399/69 |
| 2011/0318039 | A1 * | 12/2011 | Watanabe | 399/69 |

* cited by examiner

*Primary Examiner* — Clayton E Laballe
*Assistant Examiner* — Leon W Rhodes, Jr.
(74) *Attorney, Agent, or Firm* — Staas & Halsey LLP

(57) ABSTRACT

A power control apparatus and an image forming apparatus is provided to prevent a heating element from overheating when DC power is supplied and to perform normal operation regardless of the type of input power. The power control apparatus includes a power supply to supply power to a load, an alternating current (AC) power switch to discontinuously switch on AC power between the power supply and the load, and a direct current (DC) cutoff circuit to block supply of DC power through the AC power switch to prevent supply of the DC power to the load via the AC power switch when the DC power is input through the power supply.

20 Claims, 7 Drawing Sheets

POWER CONTROL APPARATUS AND IMAGE FORMING APPARATUS

CROSS-REFERENCE TO RELATED APPLICATIONS

This application claims the benefit of Korean Patent Application No. 10-2012-0087248, filed on Aug. 9, 2012 in the Korean Intellectual Property Office, the disclosure of which is incorporated herein by reference in its entirety.

BACKGROUND OF THE INVENTION

1. Field of the Invention

Embodiments of the present general inventive concept relate to a power control apparatus to supply power to a fusing heater of an image forming apparatus.

2. Description of the Related Art

An image forming apparatus, such as a laser printer, forms an image on a printing medium by scanning light onto a photosensitive body charged at a certain voltage to form an electrostatic latent image, developing the electrostatic latent image with toner, i.e., a developing agent, transferring the developed image to the printing medium (paper) and fusing the transferred image. A fusing unit provided to fuse operation fuses an image on the surface of the printing medium by heating the paper to which the image has been transferred to a proper temperature and pressing the paper. To this end, the fusing unit may need to be controlled to heat the printing medium to a temperature suitable for the fusing operation and maintain the temperature during printing. If the fusing unit fails to reach the proper temperature, the quality of the image formed on the printing medium may be degraded. If the temperature of the fusing unit exceeds the proper temperature, malfunction may be caused by overheating.

As direct current (DC) power transmission has recently begun to be implemented due to low carbon and green energy and a smart grid, regions to which DC power is supplied as commercial power instead of alternating current (AC) power have emerged. However, for an image forming apparatus such as a laser printer which performs printing by melting toner at high temperature and fusing the same to a printing medium, an AC power switch arranged in a path of power transfer to a heating element used as a heat source may be controlled only when AC power is applied. Accordingly, in regions to which DC commercial power is supplied, precaution may need to be taken since the AC power switch may be uncontrollable, and thus the heating element may overheat over a target temperature.

SUMMARY OF THE INVENTION

Therefore, the present general inventive concept provides a power control apparatus and an image forming apparatus that may prevent a heating element from overheating when DC power is supplied and perform normal operations regardless of the type of input power.

The present general inventive concept also provides an image forming apparatus in which supply of power to a fusing unit may be stably controlled to ensure that the fusing unit generates heat at a proper target temperature.

The present general inventive concept also provides a power control apparatus and an image forming apparatus which allow safe printing by preventing a fusing unit from overheating due to malfunction of a switching device of transmitting AC power to the fusing unit when DC power is input instead of AC power.

Additional features and utilities of the present general inventive concept will be set forth in part in the description which follows and, in part, will be obvious from the description, or may be learned by practice of the general inventive concept The foregoing and/or other features and utilities of the present general inventive concept are achieved by providing a power control apparatus including a power supply to supply power to a load, an alternating current (AC) power switch to discontinuously switch on AC power between the power supply and the load, and a direct current (DC) cutoff circuit to block supply of DC power through the AC power switch to prevent supply of the DC power to the load via the AC power switch when the DC power is input through the power supply.

The DC cutoff circuit is a capacitor connected to a control signal input terminal of the AC power switch in series.

The AC power switch is a Triode for Alternating Current (TRIAC), and the control signal input terminal is a gate terminal of the TRIAC.

The AC power switch includes a first transistor adapted to be turned on by a control signal to operate the load, a photo Triode for Alternating Current (TRIAC) adapted to be turned on with emission of light when the first transistor is turned on, and a TRIAC adapted to be turned on by the turned-on photo TRIAC to allow AC power to be supplied to the load.

The DC cutoff circuit is a capacitor connected in series to a side of the photo TRIAC allowing current to be input thereto.

The load is a fusing heater of an image forming apparatus, and the control signal to operate the load is a control signal to heat the fusing heater to a target temperature.

The AC power between the power supply and the load is discontinuously controlled by the AC power switch.

The power control apparatus further includes a display, and a controller to control the display to inform that supply of power to the load has been blocked as supply of power through the AC power switch has been blocked due to input of DC power.

The foregoing and/or other features and utilities of the present general inventive concept may also be achieved by providing a power control apparatus including a power supply to supply power to a load, an alternating current (AC) power switch to discontinuously switch on AC power between the power supply and the load, a direct current (DC) cutoff circuit to block supply of DC power through the AC power switch when the DC power is input to the power supply, so as to prevent the DC power from being supplied to the load via the AC power switch, a DC power supply circuit comprising a DC/DC converter operated by a control signal to operate the load so as to convert a DC power input to the power supply into a DC power to be supplied to the load, and a path diversion device to divert a path for power transmission to allow one of the AC power supplied through the AC power switch and the DC power supplied through the DC/DC converter to be selectively supplied to the load, and a controller to, if supply of power for heating to the load through the AC power switch is blocked by the DC cutoff circuit and thereby the load is not heated when a DC power is input to the power supply, drive the DC/DC converter to generate a converted DC power, cause the converted DC power to be transmitted to the load to heat the load, and discontinuously turn on the DC/DC converter during transmission of the converted DC power to the fusing heater to maintain the load at a target temperature, so as to allow stable heating of the load.

The DC/DC converter is discontinuously operated by the control signal to operate the load such that a necessary amount of power for operation of the load is supplied to the heat producing body.

The DC cutoff circuit is a capacitor connected to a control signal input terminal of the AC power switch in series.

The AC power switch is a Triode for Alternating Current (TRIAC), and the control signal input terminal is a gate terminal of the TRIAC.

The AC power switch includes a first transistor adapted to be turned on by a control signal to operate the load, a photo Triode for Alternating Current (TRIAC) adapted to be turned on and emit light when the first transistor is turned on, and a TRIAC adapted to be turned on by the turned-on photo TRIAC to allow AC power to be supplied to the load.

The DC cutoff circuit is a capacitor connected in series to a side of the photo TRIAC allowing current to be input thereto.

The load is a fusing heater of an image forming apparatus, and the control signal to operate the load is a control signal to heat the fusing heater to a target temperature.

The AC power between the power supply and the load is discontinuously controlled by the AC power switch.

The power control apparatus further includes a display and a controller to control the display to inform that supply of power to the load has been blocked as supply of power through the AC power switch has been blocked due to input of DC power.

The foregoing and/or other features and utilities of the present general inventive concept may also be achieved by providing an image forming apparatus including a fusing unit provided with a fusing heater and adapted to fuse an image on a printing medium, a power supply to supply power to the fusing heater, an alternating current (AC) power switch to discontinuously switch on AC power between the power supply and the fusing heater, and a direct current (DC) cutoff circuit to block supply of DC power through the AC power switch when the DC power is input to the power supply, so as to prevent the DC power from being supplied to the fusing unit through the AC power switch to cause the fusing unit to be heated over a target temperature.

The foregoing and/or other features and utilities of the present general inventive concept may also be achieved by providing an image forming apparatus including a fusing unit provided with a fusing heater and adapted to fuse an image to a printing medium, a power supply to supply power to the fusing heater, an alternating current (AC) power switch to discontinuously switch on AC power between the power supply and the fusing heater, a direct current (DC) cutoff circuit to block supply of DC power through the AC power switch when the DC power is input to the power supply, so as to prevent the DC power from being supplied to the fusing heater via the AC power switch, a DC power supply circuit comprising a DC/DC converter operated by a control signal to operate the fusing heater so as to convert a DC power input to the power supply into a DC power to be supplied to the fusing heater, and a path diversion device to divert a path for power transmission to allow one of the AC power supplied through the AC power switch and the DC power supplied through the DC/DC converter to be selectively supplied to the fusing heater, and a controller to, if supply of power for heating to the fusing heater through the AC power switch is blocked by the DC cutoff circuit and thereby the fusing heater is not heated when DC power is input to the power supply, drive the DC/DC converter to generate a converted DC power, cause the converted DC power to be transmitted to the fusing heater to heat the fusing heater, and discontinuously turn on the DC/DC converter during transmission of the converted DC power to the fusing heater to maintain the fusing heater at a target temperature, so as to allow stable heating of the fusing heater.

The foregoing and/or other features and utilities of the present general inventive concept may also be achieved by providing a power control apparatus including a power supply to supply power to a load; a temperature sensor to detect a temperature of the load; a temperature adjuster circuit disposed between the power supply and the load to adjust power from the power supply to the load to maintain the load at a predetermined temperature, the temperature adjuster circuit including a power supply switch to discontinuously supply AC power to the fusing heater, a DC cutoff circuit to block DC power from the power supply switch to prevent DC power from being supplied to the load through the power supply switch, a DC/DC converter circuit to, when DC power is supplied to the power supply, convert DC power input to the power supply into DC power to be supplied to the load; and a controller to compare the detected temperature of the load with a predetermined temperature and, when the detected temperature is below the predetermined temperature, to transmit a control signal to simultaneously disconnect the power supply switch from the load and connect the DC/DC converter to the load, and to discontinuously turn on the DC/DC converter to maintain the load at a target temperature to normally operate the load regardless of the type of power that is supplied to the power supply.

The controller may, when DC power is input to the power supply, generate a signal to output an alarm from a speaker of the power control apparatus indicating that an abnormally low temperature of the load has been detected, and displays an error message on a display of the power control apparatus to alert a user that DC power is erroneously being supplied to the power supply.

The foregoing and/or other features and utilities of the present general inventive concept may also be achieved by providing a method of controlling power supplied to a load of an image forming apparatus, the method including providing power to the image forming apparatus; determining whether the load has an abnormally low temperature; and transmitting, when the load is determined to have an abnormally low temperature, a control signal to simultaneously disconnect a power supply switch from the load and connect a DC/DC converter to the load, and discontinuously turning on the DC/DC converter to maintain the load at a target temperature to normally operate the load when the image forming apparatus is supplied with DC power.

The method may further include outputting, when it is determined that the load has an abnormally low temperature, an alarm from a speaker of the image forming apparatus indicating that an abnormally low temperature of the load has been detected; and displaying an error message on a display of the image forming apparatus to alert a user that DC power is erroneously being supplied to the image forming apparatus.

The power supply switch may be an AC power supply switch that allows both AC power and DC power to the load.

The AC power supply switch may be a Triode for Alternating Current (TRIAC).

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
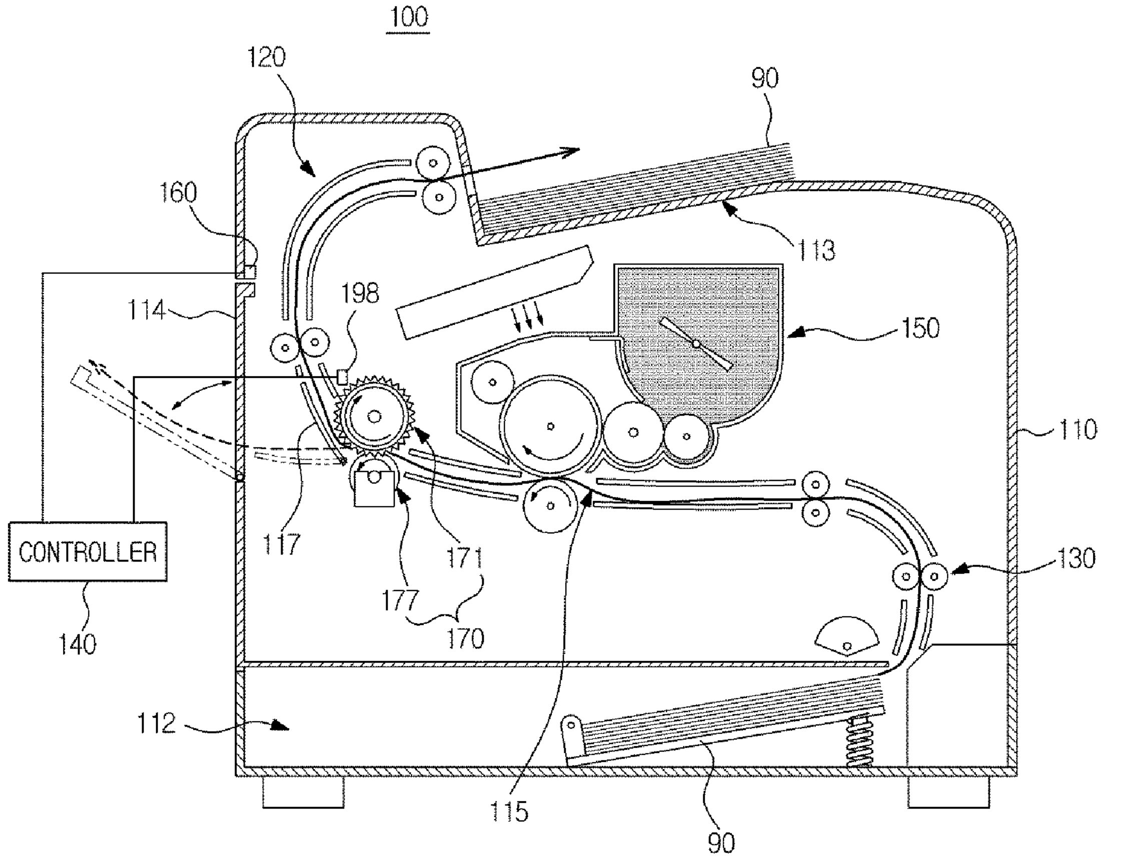
FIG. 1 is a view illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a view illustrating an image forming apparatus 100 according to an exemplary embodiment of the present general inventive concept. As shown in FIG. 1, the image forming apparatus 100 includes a case 110 defining an external appearance, and a plurality of units provided in the case 110, i.e., a feed unit 130, an image transfer unit 150, a fusing unit 170, a discharge unit 120, and a controller 140.

The case 110 is provided with a feed unit 130 to feed a printing medium 90 toward the image transfer unit 150 and a discharge unit 120 to discharge the printing medium 90 outside of the case 110 of the image forming apparatus 100, and a printing medium transport path 115 is formed between the feed unit 130 and the discharge unit 120 to allow the printing medium 90 fed from the feed unit 130 to be discharged through the discharge unit 120. The feed unit 130 includes a feed cassette 112 detachably coupled to a lower portion of the case 110. The discharge unit 120 is divided into a main discharge unit 113 to discharge a printing medium 90 as a default unit and an auxiliary discharge unit 114 to selectively discharge a printing medium 90. The main discharge unit 113 is realized with a slope arranged at an upper portion of the case 110, and the auxiliary discharge unit 114 is realized by a rear cover coupled to the rear surface of the case 110 to vertically open and close. The auxiliary discharge unit 114 presented in a dotted line, as illustrated in FIG. 1, presents the open state the rear cover. The direction in which the printing medium 90 is discharged is realized by a variable printing medium transport guide 117 that pivotably turns a certain angle according to opening of the rear cover of the auxiliary discharge unit 114. Therefore, when a user opens the rear cover of the auxiliary discharge unit 114, the variable printing medium transport guide 117 is turned to the position indicated with the dotted line (open position) to cause the printing medium 90 to be discharged to the auxiliary discharge unit 114. When the user closes the rear cover of the auxiliary discharge unit 114, the variable printing medium transport guide 117 pivotably turns back to its original position (closed position) and the printing medium 90 is transported to the main discharge unit to be discharged by the main discharge unit 113.

The feed cassette 112 is installed in the case 110 adjacent to the feed unit 130 so that the feed unit 130 may feed the printing medium 90, which is stacked in the feed cassette 112, to one side of the image transfer unit 150.

The image transfer unit 150 is installed at the central portion of the case 110 to transfer an image corresponding to an image signal input from outside the image forming apparatus to the upper surface of a printing medium 90.

The fusing unit 170 is installed in the case 110 adjacent to the auxiliary discharge unit 114 to semi-permanently fuse the transferred image on the printing medium 90. The fusing unit 170 includes a heating unit 171 and a pressing unit 177, which will be described in detail below with reference to FIG. 2.

The discharge unit 120, which is installed in the case 110 adjacent to the fusing unit 170, includes a plurality of discharge rollers to discharge the printing medium 90 having an image fused thereon by the fusing unit 170 outside the main case 110 of the image forming apparatus 100.

The controller 140, which controls overall operation of the image forming apparatus 100, is electrically connected to communicate with a plurality of sensors that detect a transport state of a printing medium 90 and opening or closing state of the rear cover. For example, the controller 140 is electrically connected to communicate with a rear cover detection sensor 160 and a temperature sensor 198.

When a printing command and an image signal are input to the image forming apparatus 100 when the image forming apparatus 100 is in standby mode, each device of the image forming apparatus 100 is controlled by the controller 140 to form an image corresponding to the image signal on the surface of the printing medium 90.

Figure 2:
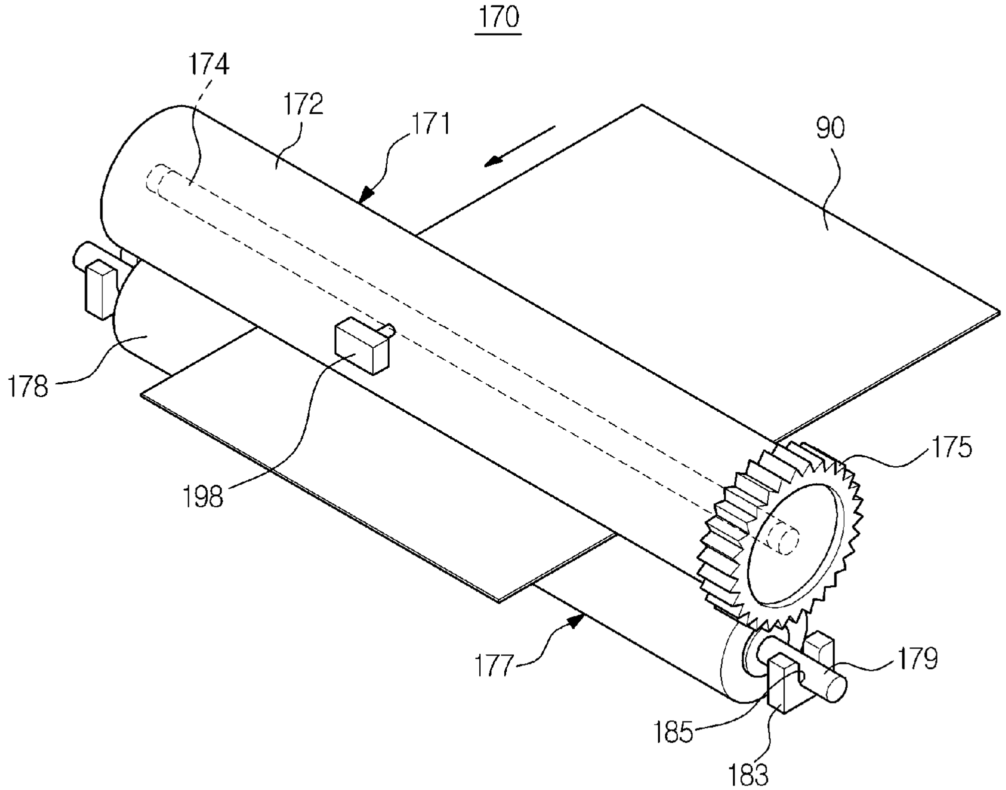
FIG. 2 is a view illustrating the structure of a fusing unit of the image forming apparatus shown in FIG. 1.

That is, the feed unit 130 transports stacked printing media 90 one at a time to one side of the image transfer unit 150, and the image transfer unit 150 forms an image corresponding to an input image signal on the surface of a printing medium 90 and transfers the formed image to an upper surface of the printing medium 90 transported by the feed unit 130. The printing medium 90 having the image transferred thereon is then automatically transported to one side of the fusing unit 170, and the fusing unit 170 passes the transported printing medium 90 between a heating roller 172 and the pressure roller 178, as illustrated in FIG. 2, while simultaneously applying heat and pressure to the printing medium 90 to cause the image to be fused on the printing medium 90. The printing medium 90 having the image fused thereon is then automatically transported to one side of the discharge unit 120, and the discharge unit 120 discharges the transported printing medium 90 outside of the case 110 of the image forming apparatus 100. Thereby, the printing operation of an image on the printing medium 90 is completed.

FIG. 2 is a view illustrating the structure of a fusing unit 170 of the image forming apparatus shown in FIG. 1. As shown in FIG. 2, the fusing unit 170 of the image forming apparatus 100 according to the illustrated embodiment of the present general inventive concept includes a heating unit 171 to heat the printing medium 90, a pressing unit 177 to contact the heating unit 171 to apply a predetermined pressure to the printing medium 90, and a temperature sensor 198 to detect the temperature of the heating unit 171.

The heating unit 171 includes a heating roller 172 rotatably installed in the image forming apparatus 100, a heating roller driving gear 175 installed at one side of the heating roller 172 and adapted to receive a predetermined rotational force transferred from the outside to rotate the heating roller 172, and a fusing heater 174 (e.g., heat lamp) interposed in the heating roller 172 and serving as a heating element to heat the heating roller 172 to a predetermined target temperature through, for example, radiation. Here, the heating roller 172 is formed in a hollow shape to allow the fusing heater 174 to be interposed therein, and formed of a metal material which may be heated by the fusing heater 174. As the fusing heater 174, a lamp, e.g., a halogen lamp that may heat the heating roller 172 in a short time is used. Although the heating unit 171 of the present general inventive concept has been described above, the present invention is not limited to the arrangement described above and illustrated in FIG. 2. For example, the fusing heater 174 may be installed outside the heating roller 172 to heat the heating roller 172 through, for example, radiation.

The pressing unit 177, which is rotatably installed in the image forming apparatus 100 to face the heating roller 172, includes a pressure roller 178 to press the printing medium 90 against the heating roller 172. The pressure roller 178 is formed of an elastic material, such as rubber to smoothly press the printing medium 90 against the heating roller 172, such that a rotating shaft 179 is provided therein to allow the pressure roller 178 to rotate. The rotating shaft 179 is seated in a seating groove 185 formed on a pressing roller support guide 183.

Figure 3:
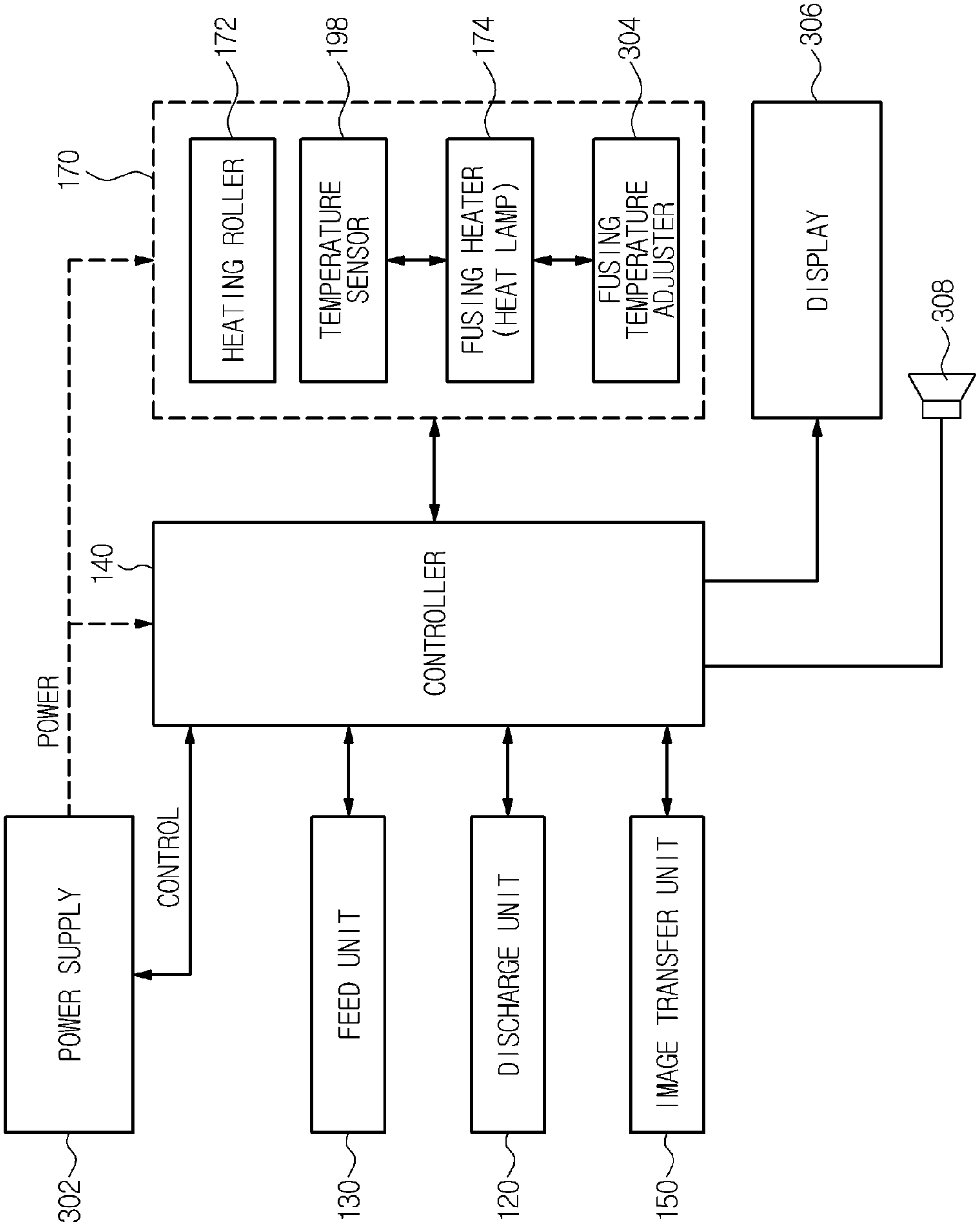
FIG. 3 is a view illustrating a control system of the image forming apparatus shown in FIG. 1.

FIG. 3 is a view illustrating a control system of the image forming apparatus shown in FIG. 1. As shown in FIG. 3, a feed unit 130, discharge unit 120, image transfer unit 150, fusing unit 170, display 306, and speaker 308 are electrically connected to the controller 140, which controls overall operation of the image forming apparatus 100, so as to communicate with the controller 140. A power supply 302 may generate DC power of 5V and 24V for the system controller 140 and applies the DC power to several parts including the fusing unit 170. The power supply 302 may be a switched-mode power supply (SMPS). The fusing unit 170 includes a heating roller 172, a fusing heater 174, a fusing temperature adjuster 304, and a temperature sensor 198. The heating roller 172, fusing heater 174. and temperature sensor 198 are the same as those described above with reference to FIGS. 1 and 2. The fusing temperature adjuster 304 controls the temperature of the fusing heater 174 in response to a control signal from the controller 140. In particular, the controller 140 and the fusing temperature adjuster 304 ensure that the fusing heater 174 does not become overheated and keeps the fusing heater 174 maintained at a target temperature by differently controlling power supplied to the fusing heater 174 depending on the type of power (DC or AC power) that is being supplied via the power supply 302. The display 306 displays state information (including information on operation) about the image forming apparatus 100, including an information message informing the user of the type of power (DC or AC power) being supplied to the fusing unit 170 via the power supply 302, and an information message informing the user of the state information (e.g., temperature information) about the fusing heater 174. The speaker 308 outputs an announcement voice or an alarm sound that may be generated during operation of the image forming apparatus 100.

Figure 4:
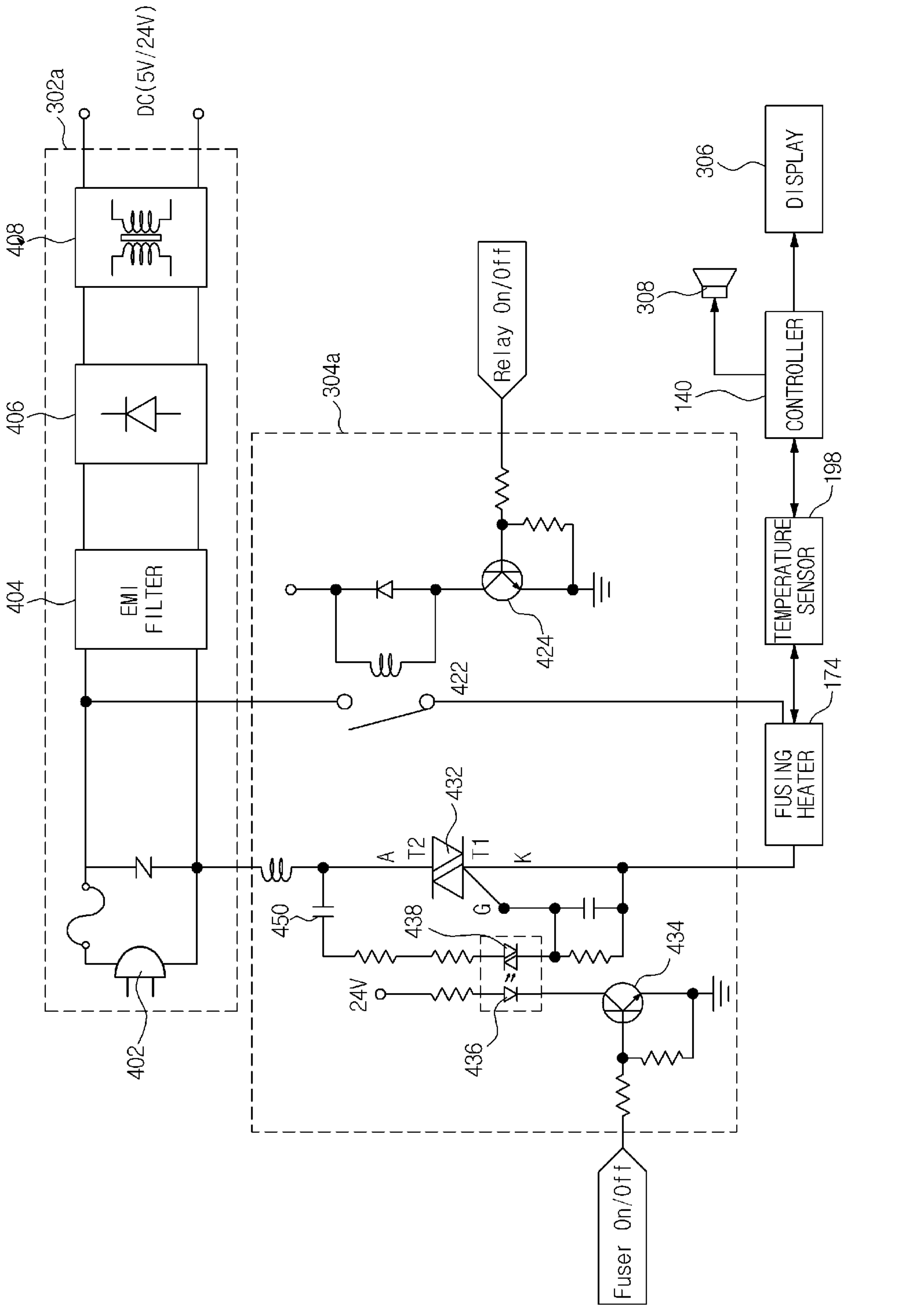
FIG. 4 is a view illustrating one embodiment of the power supply and the fusing temperature adjuster shown in FIG. 3.
Figure 5:
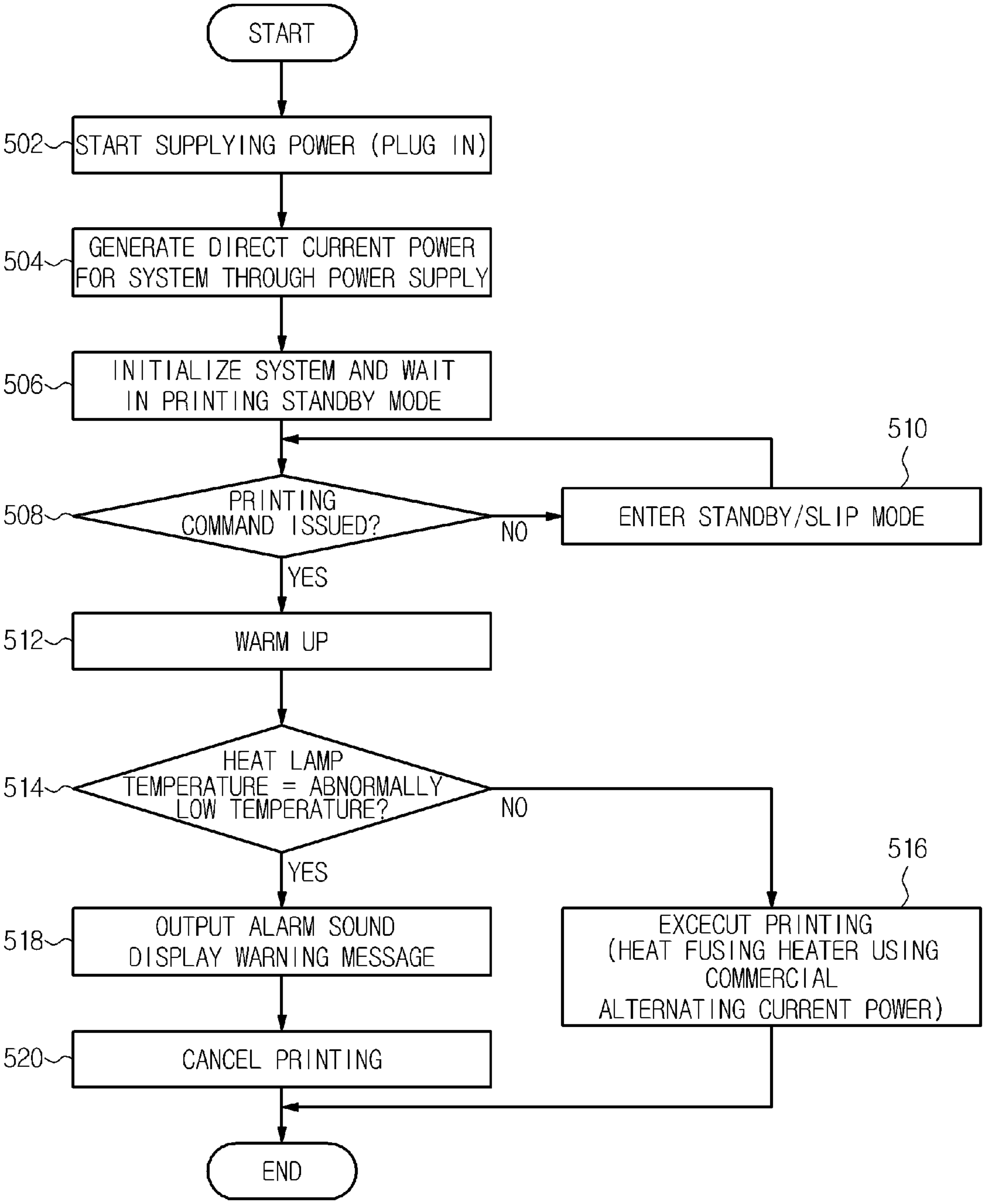
FIG. 5 is a view illustrating a method of controlling the image forming apparatus shown in FIG. 4.

FIGS. 4 and 5 illustrate an embodiment of the present general inventive concept. In the illustrated embodiment of the present general inventive concept, when commercial AC power is supplied to the image forming apparatus 100, the fusing unit 170 is controlled to fuse an image using the AC power. When commercial DC power is supplied to the image forming apparatus 100, supply of direct current is blocked using a DC cutoff circuit to prevent overheating of the fusing heater 174, and an alarm sound is generated and output from speaker 308.

FIG. 4 is a view illustrating examples **302*a* and 304*a* of the power supply 302 and the fusing temperature adjuster 304 shown in FIG. 3. The power supply 302*a* and the fusing temperature adjuster 304*a* shown in FIG. 4 are power control apparatuses that control power supplied to the fusing heater 174** which is a heating element.

The power supply **302*a* includes a plug 402, an electromagnetic interference (EMI) filter 404, a rectifier 406, and a transformer 408. The plug 402 is provided at one end of a power cable of the image forming apparatus 100 to be plugged into an electrical outlet. The EMI filter 404, which serves to eliminate various noise included in the power cable through which commercial power (DC or AC power) is supplied, is a line filter including a coil and a capacitor. The rectifier 406 converts AC power into DC power, or coverts AC power into AC power with a targeted phase. The transformer 408 lowers the voltage of the power rectified by the rectifier 406 to produce a voltage of a target level. In the embodiment shown in FIG. 4, two different DC powers of 5V and 24V are generated for the system. The 5V DC power is supplied to a microprocessor, such as the controller 140 and circuit elements, while the 24V DC power is supplied to the fusing temperature adjuster 304*a*, which is described below. The 5V and 24V DC powers for the system output from the power supply 302*a* may also be selectively supplied to other constituents of the image forming apparatus 100. When commercial AC power is supplied from the electrical outlet through the plug to the power supply 302*a*, the power supply 302*a* generates DC power for the system through AC-DC conversion. When commercial DC power is supplied to the power supply 302*a*, the power supply 302*a*** generates DC power for the system through DC-DC conversion.

The fusing heater 174 generates heat using the power supply **302*a* described above as the energy source, and transfers the generated heat to the heating roller 172 to heat the heating roller 172. The heating roller 172 heated by the fusing heater 174 operates together with the pressure roller 178 to semi-permanently fuse an image transferred to the printing medium 90. Since continuous supply of power to the fusing heater 174 may cause the fusing heater 174 to be overheated over a target temperature, power is discontinuously supplied to the fusing heater 174. That is, the fusing temperature adjuster 304*a* shown in FIG. 4 turns on a first relay 422 electrically connected to one end of the fusing heater 174 and, while one end of the fusing heater 174 is electrically connected with the power supply 302*a*, the fusing temperature adjuster 304*a* performs discontinuous supply of power by repeatedly turning on and off a Triode for Alternating Current (TRIAC) 432, and an AC power switch electrically connected to the other end of the fusing heater 174 allows the fusing heater 174 to be heated to, and maintained at, a target temperature. That is, the fusing temperature adjuster 304*a* is involved in supplying power to the fusing heater 174 and also involved in controlling the temperature of the fusing heater 174** through discontinuous control of supply of power.

In the fusing temperature adjuster **304*a* as above, the configuration and operation of the first relay 422 and a peripheral circuit thereof are as follows. The transistor 424, which is turned on by a Relay On signal, is provided to allow current to flow through the coil of the first relay 422. When a printing command is issued, the controller 140 generates a Relay On signal to turn on the transistor 424 to perform printing. As current flows through the transistor 424 that is turned on, current is applied to the coil and thus the first relay 422 is turned on. When the first relay 422 is turned on, one end of the fusing heater 174 is electrically connected with the power supply 302*a***.

Under this condition, discontinuous supply of power to the fusing heater 174 may be performed by turning on and off the TRIAC 432 to heat the fusing heater 174 and control the temperature thereof. The TRIAC 432 and the peripheral circuit thereof are configured and operated as follows. The peripheral circuit of the TRIAC 432 includes a transistor 434 adapted to be turned on and off according to a Fuser On/Off signal generated by the controller 140, a light emitting device 436 to emit light when the transistor 434 is turned on, and a photo TRIAC 438 allowing electrical current to flow therethrough when the light emitting device 436 emits light. When electrical current flows through the photo TRIAC 438, a triggering current is supplied through a gate G, which is a control signal input terminal, to turn on the TRIAC 432, and through the TRIAC 432 that is turned on, the fusing heater 174 is electrically connected to the power supply 302*a*. For the peripheral circuit of the TRIAC 432, the light emitting device 436 and the photo TRIAC 438 may configure a single module. If the first relay 422 and the TRIAC 432 are both turned on while commercial AC power is input to the power supply 302*a*, current flows between the power supply 302*a* and the fusing heater 174 and the fusing heater 174 may be heated. The temperature of the fusing heater 174 is detected by a temperature sensor 198 and provided to the controller 140, and the controller 140 compares the detected temperature of the fusing heater 174 with a predetermined temperature. If the temperature of the fusing heater 174 is higher than the predetermined temperature, a Fuser Off signal is applied to the transistor 434 to turn off the photo TRIAC 438 and accordingly turn off (deactivate) the TRIAC 432, thereby blocking supply of power to the fusing heater 174 to maintain the temperature of the fusing heater 174 within a certain range and prevent the fusing heater 174 from overheating.

Regarding the fusing temperature adjuster 304*a* of FIG. 4, the TRIAC 432 is a non-contact switching device for an AC circuit. When a certain amount of current passes through the gate G, electricity is applied between the anode A and the cathode K and the TRIAC 432 is switched on. The TRIAC 432 may be switched off by lowering the amount of current between the anode A and the cathode K below the amount of bias current. This means that the TRIAC 432 is utilized as a switch only when AC power is supplied to the TRIAC 432, and it does not function as a switch when DC power is continuously supplied to the TRIAC 432 to keep the TRIAC 432 turned on. That is, when AC power is supplied in the form of a sine wave with the TRIAC 432 activated by a Fuser On signal, current supplied at the zero point of the AC power via T2 of the TRIAC 432 is zero, and therefore the TRIAC 432 is repeatedly turned on and off according to the phase (period) of the AC power. Turing on/off the TRIAC 432, which is implemented through supply of AC power, is different from the switching operation performed by a Fuser On/Off signal. That is, the Fuser On/Off signal serves to activate/deactivate the TRIAC 432 to allow the TRIAC 432 to operate as a switch. By an On/Off operation of the TRIAC 432, which is performed by the AC power input with the TRIAC 432 activated by the Fuser On signal, the average amount of current supplied to the fusing heater 174 via the TRIAC 432 is controlled.

If DC power is input with the TRIAC 432 activated by the Fuser On signal, the TRIAC 432 is kept on and not controlled to be turned on/off, and thereby the average amount of current supplied to the fusing heater 432 via the TRIAC 432 may increase excessively, causing the temperature of the fusing heater 174 to rise over the target temperature. Accordingly, the image forming apparatus 100, according to the illustrated embodiment of the present general inventive concept, is provided with a DC cutoff capacitor 450, which is a DC cutoff circuit, in the peripheral circuit of the TRIAC 432 of the fusing temperature adjuster 304*a*, so that when commercial DC power is input, current supplied to the photo TRIAC 438 is cut off and current of the gate G is lowered, and thus the TRIAC 432 is turned off. When the TRIAC 432 is turned off, supply of power to the fusing heater 174 is blocked and thus overheating of the fusing heater 174 may be prevented.

If supply of power to the fusing heater 174 is blocked by operation of the DC cutoff capacitor 450 when commercial DC power is input, the temperature of the fusing heater 174 detected by the temperature sensor 198 may become even lower than the normal temperature of the fusing heater 174 at which printing is normally performed. If such an abnormally low temperature of the fusing heater 174 is detected, the controller 140 may sound an alarm through the speaker 308 and inform the user of detection of an abnormally low temperature of the fusing heater 174 by displaying an error message on the display 306, and suggest possibility of input of commercial DC power as a possible cause of the error. The user using the image forming apparatus 100 may recognize the input of power as being improper for the image forming apparatus 100 through the alarm sound from the speaker 308 and the information message displayed on the display 306 and, upon recognition, the user may take immediate action (e.g., to block supply of power) to correct the error.

FIG. 5 is a view illustrating a method of controlling the image forming apparatus 100 shown in FIG. 4. As shown in FIG. 5, supply of power to the image forming apparatus 100 begins with plugging the plug 402 in (operation 502). At this time, regardless of whether the supplied power is commercial AC power or commercial DC power, the power supply 302*a* generates 5V and 24V DC powers for the system through the rectifier 406 and the transformer 408 (operation 504). When AC power is supplied, DC power for the system is generated through AC-DC conversion. When commercial DC power is supplied, DC power for the system is generated through DC-DC conversion. The 5V and 24V DC powers are supplied to various parts of the image forming apparatus 100 and used to initialize and prepare the system of the image forming apparatus 100 in a standby mode for printing (operation 506). For example, the 5V DC power is supplied to the controller 140 to prepare the controller 140 to control overall operation of the image forming apparatus 100 while the 24V DC power is supplied to the fusing temperature adjuster 304*a* to prepare the fusing temperature adjuster 304*a* to heat the fusing heater 174.

If an operation command (e.g., a printing command) is not issued for a predetermined time after the system of the image forming apparatus 100 is initialized and prepared in the standby mode for printing (NO in operation 508), the image forming apparatus 100 enters the standby/slip mode (operation 510). If a printing command is issued before or after the image forming apparatus 100 enters the standby/slip mode (YES in operation 508), warming up of the system is implemented (operation 512). A representative example of warming up to perform printing may be heating the fusing heater 174 to transfer an image. In this operation, the fusing heater 174 needs to be heated to a target temperature necessary to transfer an image. When commercial AC power is input to the power supply 302*a*, the TRIAC 432 of the fusing temperature adjuster 304*a* and the peripheral circuit thereof shown in FIG. 4 normally performs the switching operation, and therefore the fusing heater 174 may be normally heated to the target temperature by the AC power (NO in operation 514). In this case, printing operation corresponding to the printing command may be normally performed (operation 516).

On the other hand, when commercial DC power is input to the power supply 302*a*, the TRIAC 432 is not triggered due to the cutoff operation of the DC cutoff capacitor 450 of the fusing temperature adjuster 304*a* shown in FIG. 4 and normal switching is not allowed. Thereby, the fusing heater 174 is not normally heated to the target temperature, resulting in an abnormally low temperature (YES in operation 514). This suggests that overheating of the fusing heater 174 over the target temperature may be prevented by the cutoff operation of the DC cutoff capacitor 450. When the fusing heater 174 is not heated to the target temperature and an abnormally low temperature is produced, normal printing may not be performed. In this case, the controller 140 outputs an alarm sound through the speaker 308 indicating the occurrence of an abnormally low temperature in the fusing heater 174 to inform the user of the situation, and also displays a warning message reporting the abnormally low temperature of the fusing heater 174 on the display 306 (operation 518). Here, the displayed warning message may come in various forms. The warning message provided in another embodiment of the present general inventive concept may include a message of reporting failure of normal printing due to current supply of commercial DC power to the image forming apparatus 100 or a message informing the user that AC power needs to be input to perform normal printing. In addition, the controller 140 cancels the printing operation, thereby preventing unnecessary attempts to perform the printing operation (operation 520).

Figure 6:
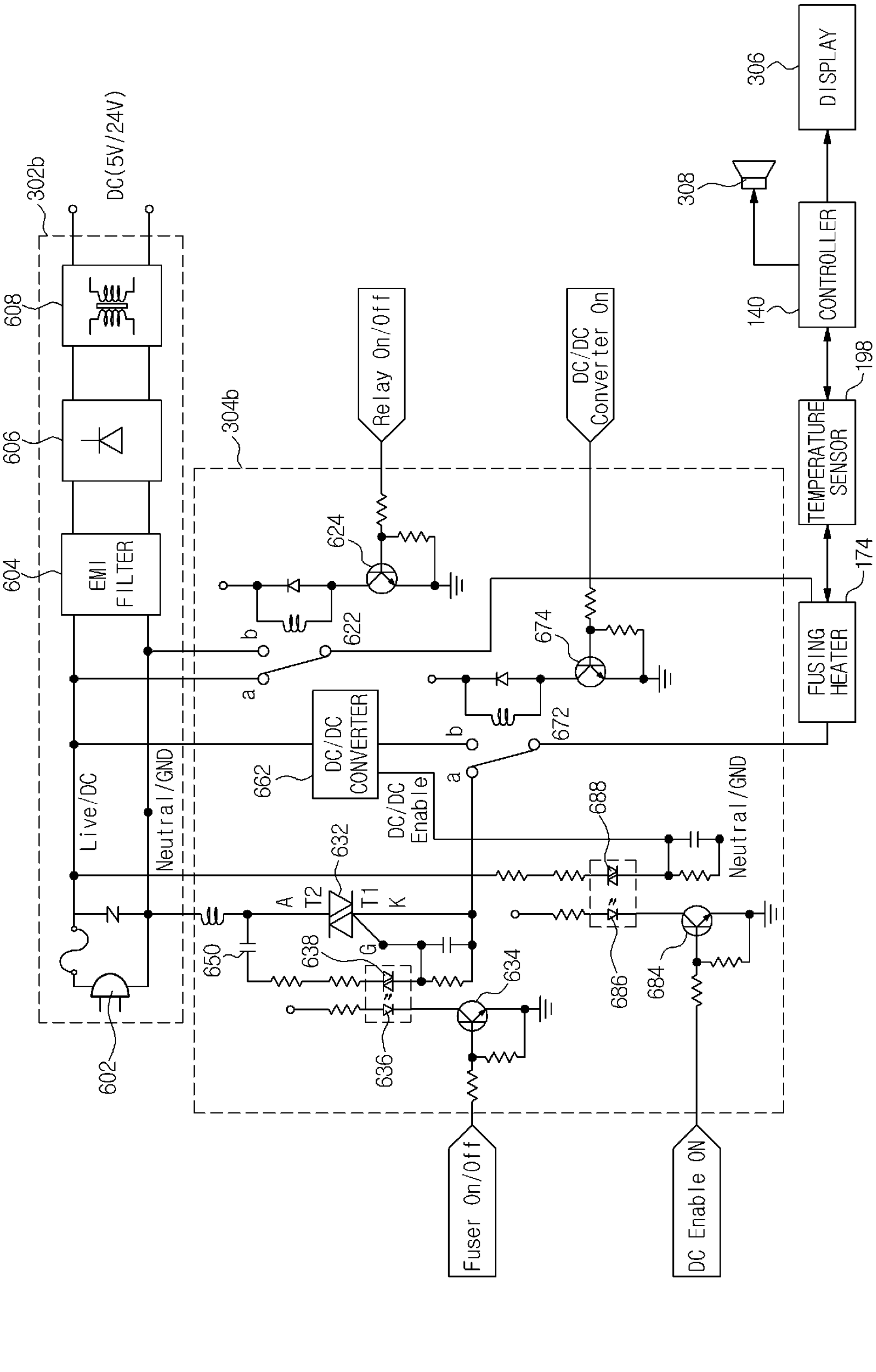
FIG. 6 is a view illustrating another embodiment of the power supply and fusing temperature adjuster shown in FIG. 3.
Figure 7:
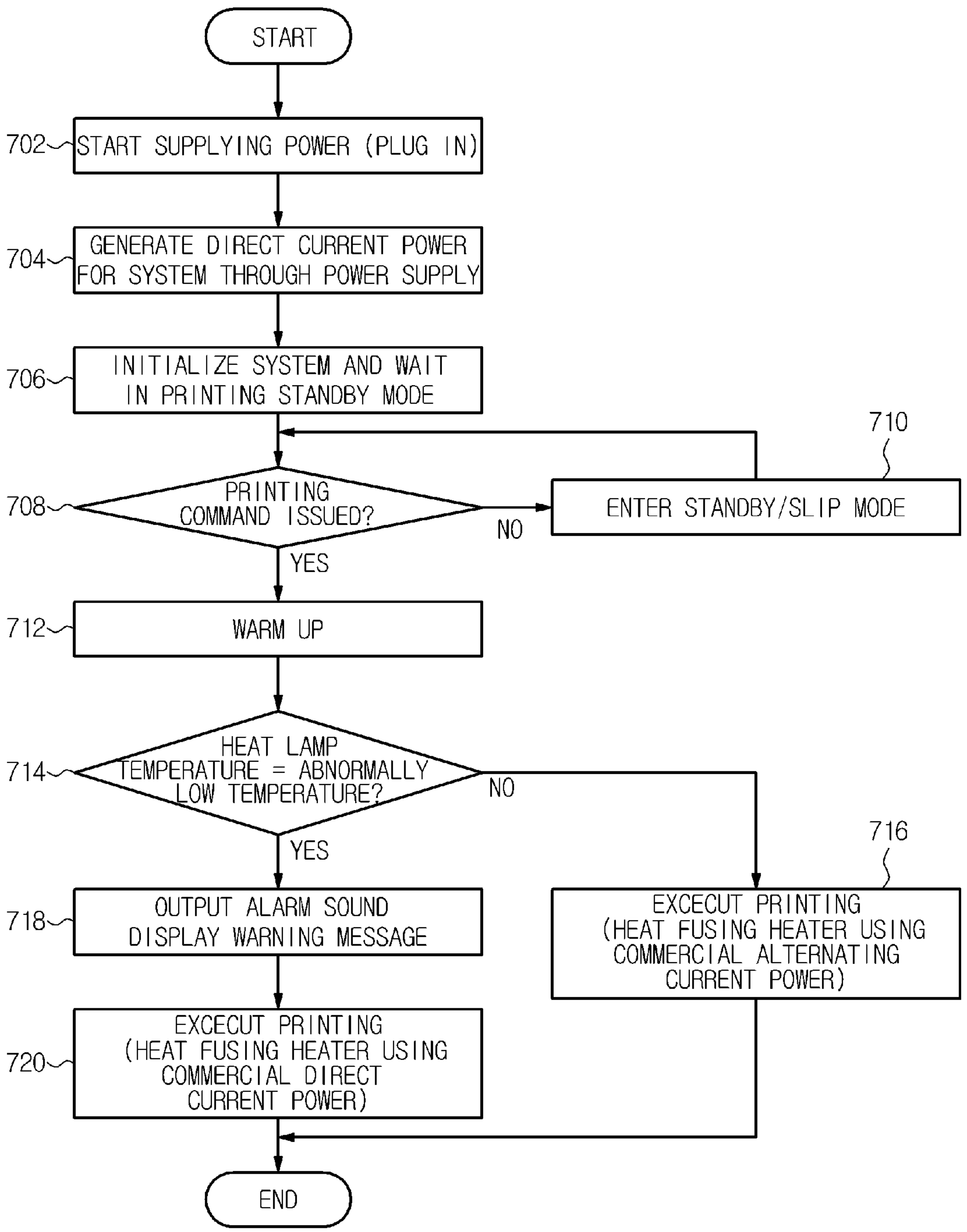
FIG. 7 is a view illustrating a method of controlling the image forming apparatus shown in FIG. 6.

FIGS. 6 and 7 illustrate another embodiment of the present general inventive concept. In the illustrated embodiment of FIGS. 6 and 7, when AC power is supplied to the image forming apparatus 100, the image forming apparatus 100 is controlled to perform normal printing using commercial AC power. When commercial DC power is supplied to the image forming apparatus 100, a DC cutoff circuit is used to prevent overheating of the fusing heater 174 by cutting off the supplied DC power, the image forming apparatus 100 is controlled to perform normal printing using commercial DC power, and an alarm informing that printing is being performed using commercial DC power is generated.

FIG. 6 is a view illustrating other examples 302*b* and 304*b* of the power supply 302 and the fusing temperature adjuster 304 shown in FIG. 3. The power supply 302*b* and the fusing temperature adjuster 304*b* shown in FIG. 6 form a power control apparatus to control power supplied to the fusing heater 174, which is a heating element.

First, the power supply 302*b* includes a plug 602, an EMI (Electromagnetic Interference Filter) filter 604, a rectifier 606, and a transformer 608. The plug 602 is provided at one end of a power cable of the image forming apparatus 100 to be plugged into an electrical outlet. The EMI filter 604, which serves to eliminate various noise included in the power cable through which commercial power (DC or AC power) is supplied, is a line filter including a coil and a capacitor. The rectifier 606 converts AC power into DC power, or coverts AC power into AC power with a targeted phase. The transformer 608 lowers the voltage of the power rectified by the rectifier 606 to produce a voltage of a target level. In the embodiment shown in FIG. 6, two different DC powers of 5V and 24V are generated for the system. The 5V DC power is supplied to a microprocessor such as the controller 140 and circuit elements, while the 24V DC power is supplied to the fusing temperature adjuster 304*b*, which is described below. The 5V and 24V DC powers for the system output from the power supply 302*b* may also be selectively supplied to other constituents of the image forming apparatus 100. When commercial AC power is supplied, the power supply 302*b* generates DC power for the system through AC-DC conversion. When commercial DC power is supplied, the power supply 302*b* generates DC power for the system through DC-DC conversion.

The fusing heater 174 generates heat using the power supply 302*b* described above as the energy source, and transfers the generated heat to the heating roller 172 to heat the heating roller 172. The heating roller 172 heated by the fusing heater 174 operates together with the pressure roller 178 to semi-permanently fuse an image transferred to the printing medium 90. Since continuous supply of power to the fusing heater 174 may cause the fusing heater 174 to be overheated over a target temperature, supply of power to the fusing heater 174 is discontinuously controlled. That is, as the fusing temperature adjuster 304*b* shown in FIG. 6 selectively turns on electricity at contact points a and b of a first relay 622 electrically connected to one end of the fusing heater 174 and selectively turns on electricity at contact points a and b of a second relay 672 electrically connected to the other end of the fusing heater 174, AC power may be supplied to the fusing heater 174 via the TRIAC 632, an AC power switch, or DC power may be supplied to the fusing heater 174 via DC/DC converter 662. That is, the fusing temperature adjuster 304*b* is involved in supplying power to the fusing heater 174 and also involved in controlling the temperature of the fusing heater 174 through discontinuous control of supply of power.

In the fusing temperature adjuster 304*b* described above, the configuration and operation of the first relay 622 and a peripheral circuit thereof are as follows. The transistor 624, which may be turned on by a Relay On signal, is provided to allow current to flow through the coil of the first relay 622. When a printing command is issued and AC power is input to the power supply 302*b*, the first relay 622 is maintained at its default state and is in electrical contact with contact point a to allow AC power to be supplied to one end of the fusing heater 174. In contrast, when a printing command is issued and DC power is input to the power supply 302*b*, the controller 140 generates a Relay On signal to turn on the transistor 624 to perform printing. As the current flows through the transistor 624 that is turned on, current is applied to the coil and thus the first relay 622 switches the turned-on state from contact point a to contact point b. Here, when the first relay 622 is at contact point a, AC power may be supplied to one end of the fusing heater 174, and when the first relay 622 is at contact point b, DC power may be supplied to one end of the fusing heater 174. That is, the first relay 622 switches the turned-on state to at least one of contact points a and b, and one end of the fusing heater 174 is electrically connected to the power supply 302*b*.

Under this condition, supply of power to the fusing heater 174 may be discontinuously performed by supplying AC power through the TRIAC 632, or supplying DC power through the DC/DC converter 662, to perform heating of the fusing heater 174 and control the temperature thereof. Here, the DC/DC converter 662 serves to convert commercial DC power input to the power supply 302*b* into a DC power to be supplied to the fusing heater 174. The configuration and operation of the TRIAC 632 and a peripheral circuit thereof are as follows. The peripheral circuit of the TRIAC 632 includes a transistor 634 adapted to be turned on or off depending on a Fuser On/Off signal generated by the controller 140, a light emitting device 636 to emit light when the transistor 634 is turned on, and a photo TRIAC 638 adapted to be turned on by emission of light by the light emitting device 636. When the photo TRIAC 638 is turned on, a trigger current is supplied via the gate G, which is a control signal input terminal, and the TRIAC 632 is turned on to allow the fusing heater 174 and the power supply 302*b* to be electrically connected through the TRIAC 632 and second relay 672. For the peripheral circuit of the TRIAC 632, the light emitting device 636 and the photo TRIAC 638 may configure a single module. If the first relay 622 and the TRIAC 632 are both turned on, current flows between the power supply 302*b* and the fusing heater 174, and thus the fusing heater 174 may be heated. The temperature of the fusing heater 174 is detected by a temperature sensor 198 and provided to the controller 140, and the controller 140 compares the detected temperature of the fusing heater 174 with a predetermined temperature. If the temperature of the fusing heater 174 is higher than the predetermined temperature, a Fuser Off signal is applied to the transistor 634 to turn off the photo TRIAC 638 and accordingly turn off (deactivate) the TRIAC 632, thereby blocking supply of power to the fusing heater 174 to maintain the temperature of the fusing heater 174 within a certain temperature range and prevent the fusing heater 174 from overheating.

Regarding the fusing temperature adjuster 304*b* of FIG. 6, the TRIAC 632 is a non-contact switching device for an AC circuit. When a certain amount of current passes through the gate G, electricity is applied between the anode A and the cathode K and the TRIAC 632 is switched on. The TRIAC 632 may be switched off by lowering the amount of current between the anode A and the cathode K below the amount of bias current. This means that the TRIAC 632 is utilized as a switch only when AC power is supplied to the TRIAC 632, and it does not function as a switch when DC power is continuously supplied to the TRIAC 632 to keep the TRIAC 632 on. That is, when AC power is supplied in the form of a sine wave with the TRIAC 632 activated by a Fuser On signal, current supplied at the zero point of the AC power via T2 of the TRIAC 632 is zero, and therefore the TRIAC 632 is repeatedly turned on and off according to the phase (period) of the AC power. Turing on/off the TRIAC 632, which is implemented through supply of AC power, is different from the switching operation performed by a Fuser On/Off signal. That is, the Fuser On/Off signal serves to activate/deactivate the TRIAC 632 to allow the TRIAC 632 to operate as a switch. By On/Off operation of the TRIAC 632, which is performed by the AC power input with the TRIAC 632 activated by the Fuser On signal, the average amount of current supplied to the fusing heater 174 via the TRIAC 632 is controlled.

The DC power supplied through the DC/DC converter 662 and the AC power supplied through the TRIAC 632 may be supplied to the other end of the fusing heater 174 via the second relay 672. Here, the second relay 672 is a path diversion device to divert the path for power transmission to allow one of the AC power supplied through the TRIAC 632 and the DC power supplied through the DC/DC converter 662 to be selectively supplied to the fusing heater 174, which is a heating element. The configuration and operation of the second relay 672 of the fusing temperature adjuster 304*b* and a peripheral circuit thereof are as follows. The transistor 674, which is turned on by a DC/DC Conversion On signal, is provided to allow current to flow through the coil of the second relay 672. When commercial AC power is input to the power supply 302*b*, the second relay 672 is maintained at its default state in which the second relay 672 is electrically connected to contact point a. In contrast, when commercial DC power is input to the power supply 302*b*, the controller 140 generates a DC/DC Conversion On signal to turn on the transistor 674. As current flows through the transistor 674 which is turned on, the coil electrically operates to switch the second relay 672 from contact point a to contact point b to turn on the second relay 672. When the second relay 672 is turned on and at contact point b, the DC power from the DC/DC converter 662 is supplied to the fusing heater 174 via the contact point b of the second relay 672, and the fusing heater 174 is heated to a target temperature by the DC power.

The DC/DC converter 662 is activated by a DC/DC Enable signal, which enables DC-to-DC conversion, to perform DC-to-DC conversion. The DC/DC Enable signal is generated in the following manner. When commercial AC power is input to the power supply 302*b* in a default state having the contact point a of the first relay 622 and the contact point a of the second relay 672 turned on, the commercial AC power is supplied to the fusing heater 174 via the TRIAC 632 and the contact point a of the first relay 622 to heat the fusing heater 174. In contrast, when commercial DC power is input to the power supply 302*b* in a default state having the contact point a of the first relay 622 and the contact point a of the second relay 672 turned on, the TRIAC 632 is turned off by operation of the DC cutoff capacitor 650, which is a DC cutoff circuit, and therefore power is not supplied to the fusing heater 174, and thus the fusing heater 174 is not heated. If an abnormally low temperature of the fusing heater 174 is detected by the temperature sensor 198, the controller 140 determines that DC power is supplied instead of AC power, and generates a DC Enable On signal to activate the DC/DC converter 662. When the transistor 684 is turned on according to the DC Enable On signal, the light emitting device 686 is turned on to emit light, and the photo TRIAC 688 is turned on by emission of light by the light emitting device 686 and a DC/DC Enable signal is generated (or activated). Here, the light emitting device 686 and the photo TRIAC 688 may configure a single module.

In FIG. 6, the DC/DC converter 662, the second relay 672 and the peripheral circuit thereof, and the photo TRIAC 688 and the peripheral circuit thereof together form a DC power supply circuit ensuring that the fusing heater 174, which is a heating element, normally operates with DC power by discontinuously supplying the DC power to the fusing heater 174 when continuous supply of the DC power to the fusing heater 174 is blocked by the DC cutoff capacitor 650. The DC power discontinuously supplied to the fusing heater 174 via the DC power supply circuit is different from the 5V and 24V DC voltage output from the transformer 608 of the power supply 302*b*.

If DC power is input with the TRIAC 632 activated by the Fuser On signal, the TRIAC 632 is kept turned on and not controlled to be turned on/off, and thereby the average amount of current supplied to the fusing heater 632 via the TRIAC 632 may increase excessively, causing the temperature of the fusing heater 174 to rise over the target temperature. Accordingly, the image forming apparatus 100, according to the illustrated embodiment of the present general inventive concept, is provided with a DC cutoff capacitor 650, which is a DC cutoff circuit, in the peripheral circuit of the TRIAC 632 of the fusing temperature adjuster 304*b*, so that when commercial DC power is input, current supplied to the photo TRIAC 638 is cut off and current of the gate G is lowered, and thus the TRIAC 632 is turned off. When the TRIAC 632 is turned off, supply of power to the fusing heater 174 is blocked and thus overheating of the fusing heater 174 may be prevented.

If supply of power to the fusing heater 174 is blocked by operation of the DC cutoff capacitor 650 when commercial DC power is input, the temperature of the fusing heater 174 detected by the temperature sensor 198 may become even lower than the normal temperature of the fusing heater at which printing is normally operated. If such an abnormally low temperature of the fusing heater 174 is detected, the controller 140 may sound an alarm through the speaker 308, inform the user of detection of an abnormally low temperature of the fusing heater 174 by displaying an error message on the display 306, and suggest possibility of input of commercial DC power as a possible cause of the error. In addition, the controller may transmit a signal to an external host computer 200 so that the external host computer 200 displays an error message on its display 206 to inform the user of an abnormally low temperature of the fusing heater 174. In the illustrated embodiment of the image forming apparatus 100, when commercial DC power is input to the image forming apparatus 100, the fusing heater 174 of the fusing unit 170 is heated to a target temperature using the DC power to be maintained at the target temperature, while normal printing is performed.

According to the configuration of the fusing temperature adjuster 304*b* shown in FIG. 6, the operation of the fusing temperature adjuster 304*b* in cases of commercial AC power and commercial DC power input to the power supply 302*b* may be summarized as follows. In case that commercial AC power is input to the power supply 302*b*, the AC power is supplied to the fusing heater 174 via the TRIAC 632 and the first relay 622 to heat the fusing heater 174 since the contact point a of the first relay 622 and the contact point a of the second relay 622 are turned on by default. Since the TRIAC 632 normally operates as a switch, control of the temperature of the fusing heater 174 may also be normally performed. In case that commercial DC power is input to the power supply 302*b*, the TRIAC 632 is turned off by operation of the DC cutoff capacitor 650, and thus the temperature of the fusing heater 174 may become abnormally low. Then, determining based on this condition that commercial DC power is input, the controller 140 activates the DC/DC converter 662 and turns on the contact point b of the first relay 622 and the contact point b of the second relay 672, thereby allowing DC current to flow through the power supply 302*b*, DC/DC converter 662, second relay 672, fusing heater 174 and first relay 622. In addition, the controller 140 discontinuously generates a DC Enable On signal to ensure that a proper amount of DC power is supplied to the fusing heater 174 to maintain the fusing heater 174 at the target temperature, thereby discontinuously controlling the operation time of the DC/DC converter 662.

FIG. 7 is a view illustrating a method of controlling the image forming apparatus 100 shown in FIG. 6. As shown in FIG. 7, supply of power to the image forming apparatus 100 begins with plugging the plug 602 in (702). At this time, regardless of whether the power supplied is commercial AC power or commercial DC power, the power supply 302*b* generates 5V and 24V DC powers for the system through the rectifier 606 and the transformer 608 (704). When AC power is supplied, DC power for the system is generated through AC-DC conversion. When commercial DC power is supplied, DC power for the system is generated through DC-DC conversion. The 5V and 24V DC powers are supplied to various parts of the image forming apparatus 100 and used to initialize and prepare the system of the image forming apparatus 100 in a standby mode for printing (706). For example, the 5V DC power is supplied to the controller 140 to prepare the controller 140 to control overall operation of the image forming apparatus 100 while 24V DC power is supplied to the fusing temperature adjuster 304*b* to prepare the fusing temperature adjuster 304*b* to heat the fusing heater 174.

If an operation command (e.g., a printing command) is not issued for a predetermined time after the system of the image forming apparatus 100 is initialized and prepared in the standby mode for printing (NO in operation 708), the image forming apparatus 100 enters the standby/slip mode (710). If a printing command is issued before or after the image forming apparatus 100 enters the standby/slip mode (YES in operation 708), warming up of the system is implemented (712). A representative example of warming up to perform printing may be heating the fusing heater 174 to transfer an image. In this operation, the fusing heater 174 needs to be heated to a target temperature necessary to transfer an image. When commercial AC power is input to the power supply 302*b*, the TRIAC 632 of the fusing temperature adjuster 304*b* and the peripheral circuit thereof shown in FIG. 6 normally performs the switching operation, and therefore the fusing heater 174 may be normally heated to the target temperature by the AC power (NO in operation 714). In this case, printing operation corresponding to the printing command may be normally performed (716).

On the other hand, when commercial DC power is input to the power supply 302*b*, the TRIAC 632 is not triggered due to the cutoff operation of the DC cutoff capacitor 650 of the fusing temperature adjuster 304*b* shown in FIG. 6 and normal switching is not allowed. Thereby, the fusing heater 174 is not normally heated to the target temperature, resulting in an abnormally low temperature (YES in operation 714). This prevents overheating of the fusing heater 174 over the target temperature by virtue of the cutoff operation of the DC cutoff capacitor 650. When the fusing heater 174 is not heated to the target temperature and an abnormally low temperature is produced and detected, the controller 140 outputs an alarm sound through speaker 308 indicating occurrence of an abnormally low temperature in the fusing heater 174 to inform the user of the situation, and displays a warning message to report the abnormally low temperature of the fusing heater 174 on the display 306 (718). In addition, the controller may transmit a signal to an external host computer 200 so that the external host computer 200 displays an error message on its display 206 to inform the user of an abnormally low temperature of the fusing heater 174. Here, the displayed warning message may come in various forms. The warning message provided in the illustrated embodiment of the present general inventive concept may include a message announcing "printing is performed using commercial DC power since the power currently supplied to the image forming apparatus 100 is commercial DC power," or the like. When the temperature of the fusing heater 174 is abnormally low, the controller 140 determines, based on the abnormally low temperature, that commercial DC power is input and, based on this determination, the controller 140 activates the DC/DC converter 662 and turns on the contact point b of the first relay 622 and the contact point b of the second relay 672 to allow direct current to flow through the power supply 302*b*, DC/DC converter 662, second relay 672, fusing heater 174, and first relay 622. In addition, the controller 140 discontinuously generates a DC Enable On signal to ensure that a proper amount of DC power is supplied to the fusing heater 174 to maintain the fusing heater 174 at the target temperature, thereby discontinuously controlling the operation time of the DC/DC converter 662 and performing printing operation with the commercial DC power (720).

As is apparent from the above description, a power control apparatus and an image forming apparatus according to an embodiment of the present general inventive concept may prevent a heating element from being overheated when DC power is supplied and perform normal operation regardless of the type of input power.

In addition, supply of power to a fusing unit of an image forming apparatus according to another embodiment of the present general inventive concept may be stably controlled to ensure that the fusing unit generates heat at a proper target temperature.

In addition, when DC power is input instead of AC power, safe printing may be ensured and the life of the fusing unit may be extended by preventing the fusing unit from being overheated due to an error operation of a switching device of transmitting AC power to the fusing unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power control apparatus comprising:

a power supply to supply power to a fusing heater;

an alternating current (AC) power switch to discontinuously switch on and off AC power, which is input through the power supply, that is provided to the fusing heater; and a direct current (DC) cutoff circuit to block a supply of DC power from flowing through the AC power switch and then flowing to the fusing heater via the AC power switch when the supply of DC power is input through the power supply.

2. The power control apparatus according to claim 1, wherein the DC cutoff circuit is a capacitor connected to a control signal input terminal of the AC power switch in series.

3. The power control apparatus according to claim 2, wherein the AC power switch is a Triode for Alternating Current (TRIAC), and the control signal input terminal is a gate terminal of the TRIAC.

4. The power control apparatus according to claim 1, wherein the AC power switch comprises:

a first transistor adapted to be turned on by a control signal to operate the fusing heater;

a photo Triode for Alternating Current (TRIAC) adapted to be turned on with emission of light when the first transistor is turned on; and a TRIAC adapted to be turned on by the turned-on photo TRIAC to allow AC power to be supplied to the fusing heater.

5. The power control apparatus according to claim 4, wherein the DC cutoff circuit is a capacitor connected in series to a side of the photo TRIAC allowing current to be input thereto.

6. The power control apparatus according to claim 4, wherein:

the control signal to operate the fusing heater is based on a target temperature.

7. The power control apparatus according to claim 1, wherein the AC power between the power supply and the fusing heater is discontinuously controlled by the AC power switch.

8. The power control apparatus according to claim 1, further comprising:

a display; and a controller to control the display to inform that supply of power to the fusing heater has been blocked as supply of power through the AC power switch has been blocked due to input of DC power.

9. The power control apparatus according to claim 1, wherein if the DC cutoff circuit is replaced with a short circuit, then the supply of DC power, which is supplied through the power supply, travels through the AC power switch to the fusing heater.

10. A power control apparatus comprising:

a power supply to supply power to a fusing heater;

an alternating current (AC) power switch to discontinuously switch on and off AC power between the power supply and the fusing heater;

a direct current (DC) cutoff circuit to block a supply of DC power through the AC power switch when the supply of DC power is input to the power supply, so as to prevent the supply of DC power from being supplied to the fusing heater via the AC power switch;

a DC power supply circuit comprising a DC/DC converter operated by a control signal to operate the fusing heater so as to convert a DC power input to the power supply into a DC power to be supplied to the fusing heater, and a path diversion device to divert a path for power transmission to allow one of the AC power supplied through the AC power switch and the DC power supplied through the DC/DC converter to be selectively supplied to the fusing heater; and a controller to, if supply of power for heating to the fusing heater through the AC power switch is blocked by the DC cutoff circuit and thereby the fusing heater is not heated when a DC power is input to the power supply, drive the DC/DC converter to generate a converted DC power, which causes the converted DC power to be transmitted to the fusing heater to heat the fusing heater, and to discontinuously turn on the DC/DC converter during transmission of the converted DC power to the fusing heater to maintain the fusing heater at a target temperature, so as to allow stable heating of the fusing heater.

11. The power control apparatus according to claim 10, wherein the DC/DC converter is discontinuously operated by the control signal to operate the fusing heater such that a necessary amount of power for operation of the fusing heater is supplied to the fusing heater.

12. The power control apparatus according to claim 10, wherein the DC cutoff circuit is a capacitor connected to a control signal input terminal of the AC power switch in series.

13. The power control apparatus according to claim 12, wherein the AC power switch is a Triode for Alternating Current (TRIAC), and the control signal input terminal is a gate terminal of the TRIAC.

14. The power control apparatus according to claim 10, wherein the AC power switch comprises:

a first transistor adapted to be turned on by a control signal to operate the fusing heater;

a photo Triode for Alternating Current (TRIAC) adapted to be turned on and emit light when the first transistor is turned on; and a TRIAC adapted to be turned on by the turned-on photo TRIAC to allow AC power to be supplied to the fusing heater.

15. The power control apparatus according to claim 14, wherein the DC cutoff circuit is a capacitor connected in series to a side of the photo TRIAC allowing current to be input thereto.

16. The power control apparatus according to claim 14, wherein:

the control signal to operate the fusing heater is a control signal to heat the fusing heater to a target temperature.

17. The power control apparatus according to claim 10, wherein the AC power between the power supply and the fusing heater is discontinuously controlled by the AC power switch.

18. The power control apparatus according to claim 10, further comprising a display; and a controller to control the display to inform that supply of power to the fusing heater has been blocked through the AC power switch due to input of DC power.

19. An image forming apparatus comprising:

a fusing unit provided with a fusing heater and adapted to fuse an image on a printing medium;

a power supply to supply power to the fusing heater;

an alternating current (AC) power switch to discontinuously switch on and off AC power, which is input through the power supply and that is provided to the fusing heater;

a direct current (DC) cutoff circuit to block a supply of DC power from flowing through the AC power switch when the supply of DC power is input to the power supply, so as to prevent the supply of DC power from being supplied to the fusing unit through the AC power switch, and to cause the fusing unit to be heated to and/or maintained at a target temperature.

20. An image forming apparatus comprising:

a fusing unit provided with a fusing heater and adapted to fuse an image to a printing medium;

a power supply to supply power to the fusing heater;

an alternating current (AC) power switch to discontinuously switch on and off AC power between the power supply and the fusing heater;

a direct current (DC) cutoff circuit to block a supply of DC power through the AC power switch when the supply of DC power is input to the power supply, so as to prevent the supply of DC power from being supplied to the fusing heater via the AC power switch;

a DC power supply circuit comprising a DC/DC converter operated by a control signal to operate the fusing heater so as to convert a DC power input to the power supply into the supply of DC power to be supplied to the fusing heater, and a path diversion device to divert a path for power transmission to allow one of the AC power supplied through the AC power switch and the DC power supplied through the DC/DC converter to be selectively supplied to the fusing heater; and a controller to, if supply of power for heating to the fusing heater through the AC power switch is blocked by the DC cutoff circuit and thereby the fusing heater is not heated when the supply of DC power is input to the power supply, drive the DC/DC converter to generate a converted DC power, cause the converted DC power to be transmitted to the fusing heater to heat the fusing heater, and discontinuously turn on the DC/DC converter during transmission of the converted DC power to the fusing heater to maintain the fusing heater at a target temperature, so as to allow stable heating of the fusing heater.

* * * * *